US012612172B2

(12) United States Patent     (10) Patent No.:   US 12,612,172 B2

Freiheit et al.     (45) Date of Patent:    Apr. 28, 2026

(54) LIFT LEVER ASSEMBLY FOR A VERTICAL TAKEOFF AND LANDING (VTOL) AIRCRAFT AND A METHOD FOR ITS USE

(71) Applicant: BETA AIR, LLC, South Burlington, VT (US)

(72) Inventors: Collin Freiheit, South Burlington, VT (US); Cody Spiegel, South Burlington, VT (US); Nicholas Moy, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 220 days.

(21) Appl. No.: 17/966,251

(22) Filed: Oct. 14, 2022

(65) Prior Publication Data

US 2024/0327012 A1    Oct. 3, 2024

(51) Int. Cl.
    B64D 31/06      (2024.01)
    B64D 31/16      (2024.01)
    B64C 29/00      (2006.01)

(52) U.S. Cl.
    CPC ............. B64D 31/06 (2013.01); B64D 31/16 (2024.01); *B64C 29/0008* (2013.01)

(58) Field of Classification Search
    CPC ................................ B64D 31/06; F02D 11/02
    See application file for complete search history.

(56) References Cited

U.S. PATENT DOCUMENTS

| | | | | |
|---|---|---|---|---|
| 2,791,664 A | * | 5/1957 | Rohacs | .................... H01H 3/20 |
| | | | | 200/332.2 |
| 3,066,889 A | | 12/1962 | Kelly | |
| 3,403,734 A | * | 10/1968 | Herrmann | ............... B64C 27/32 |
| | | | | 244/17.11 |
| 4,130,259 A | | 12/1978 | Carlson | |
| 4,603,388 A | | 7/1986 | Griffith | |
| 5,853,152 A | | 12/1998 | Evans | |
| 6,280,269 B1 | * | 8/2001 | Gaynor | ................ B63H 21/213 |
| | | | | 440/86 |

(Continued)

FOREIGN PATENT DOCUMENTS

| | | |
|---|---|---|
| CN | 109466752 A | 3/2019 |
| DE | 102012112894 A1 | 6/2014 |

OTHER PUBLICATIONS

Sensor definition, Merriam-Webster.com, <https://www.merriam-webster.com/dictionary/sensor>, accessed Dec. 14, 2024 (Year: 2024).*

(Continued)

*Primary Examiner* — Michael H Wang

(74) *Attorney, Agent, or Firm* — Lee & Hayes, P.C.

(57) ABSTRACT

A lift lever assembly for a vertical takeoff and landing (VTOL) aircraft is disclosed. The assembly includes a lever configured to control a lift propulsor of an aircraft. The assembly additionally includes at least a handle mechanically coupled to the lever, wherein the handle configured to allow transition of the lever from a thrust-engaged position to a thrust-disengaged position when the at least a handle is in an active position. The assembly also includes at least a sensor in communication with the lever, wherein the at least a sensor is configured to identify when the lever transitions from the thrust-engaged position to the thrust-disengaged position.

20 Claims, 6 Drawing Sheets

(56) References Cited

U.S. PATENT DOCUMENTS

| | | | | |
|---|---|---|---|---|
| 6,695,264 | B2 | 2/2004 | Schaeffer | |
| 7,147,182 | B1 | 12/2006 | Flanigan | |
| 7,275,711 | B1 | 10/2007 | Flanigan | |
| 8,235,330 | B2 | 8/2012 | Rozovski | |
| 8,240,617 | B2 | 8/2012 | Biest | |
| 8,272,599 | B2 | 9/2012 | Haverdings | |
| 8,844,880 | B1 * | 9/2014 | Corliss | B64C 27/32 |
| | | | | 244/234 |
| 9,354,635 | B2 | 5/2016 | Shue | |
| 9,567,065 | B2 | 2/2017 | Coote | |
| 10,011,348 | B1 * | 7/2018 | Wong | B64C 29/0025 |
| 10,144,504 | B1 | 12/2018 | Selwa | |
| 10,829,202 | B2 | 11/2020 | Haugeberg | |
| 11,459,109 | B2 | 10/2022 | Hoover | |
| 11,572,163 | B2 * | 2/2023 | Abdelli | B64C 27/68 |
| 2009/0283644 | A1 * | 11/2009 | Haverdings | B64D 31/04 |
| | | | | 74/519 |
| 2011/0093140 | A1 * | 4/2011 | Belkadi | B64D 31/02 |
| | | | | 701/3 |
| 2017/0113783 | A1 * | 4/2017 | Scofield | B64C 13/0421 |
| 2021/0269162 | A1 | 9/2021 | Hoover | |
| 2021/0380222 | A1 * | 12/2021 | Osborn | B64D 33/02 |

OTHER PUBLICATIONS

Patterson, Beta Technologies: An eVTOL Developer That's All About Flying, (webpage), Apr. 22, 2022, https://www.flyingmag.com/beta-technologies-an-evtol-developer-thats-all-about-flying/.

Dugan, "Thrust Control of VTOL Aircraft—Part Deux" NASA Ames Research Center, 2014. Retrieved from: https://ntrs.nasa.gov/api/citations/20140008647/downloads/20140008647.pdf; 13 pages.

Haptic Feedback in Motion Control, Dec. 3, 2020, retrieved from: https://www.pmdcorp.com/resources/type/articles/get/haptic-feedback-in-motion-control-article; 6 pages.

* cited by examiner

200

208

204

204

405

Controlling, using a Lever, a Lift Propulsor of an Aircraft

410

Allowing Transition, using at least a Handle, of the lever from a Thrust-Engaged Postion to a Thrust-Disengaged Position when the at least a Handle is in a Fixed Position

415

Sensing, using at least a sensor, when the Lever transitions from the Thrust-Engaged Postion to the Thrust-Disengaged Position

400

LIFT LEVER ASSEMBLY FOR A VERTICAL TAKEOFF AND LANDING (VTOL) AIRCRAFT AND A METHOD FOR ITS USE

FIELD OF THE INVENTION

The present invention generally relates to the field of vertical takeoff and landing (VTOL) aircraft. In particular, the present invention is directed to a lift lever assembly for a VTOL aircraft.

BACKGROUND

The transition from rotor based flight to fixed wing based flight may present challenges for VTOL aircraft. For example, the aircraft must gain sufficient horizontal velocity to sustain flight before lift propulsors are shut off. Dual mode VTOL aircraft are lacking in safe and effective assemblies to actuate a lift lever when lift propulsors are not needed during a flight.

SUMMARY OF THE DISCLOSURE

In an aspect of the present disclosure is a lift lever assembly for a vertical takeoff and landing (VTOL) aircraft is disclosed. The assembly includes a lever configured to control a lift propulsor of an aircraft. The assembly additionally includes at least a handle mechanically coupled to the lever, wherein the handle configured to allow, while the handle is in an active position, transition of the lever from a thrust-engaged position to a thrust-disengaged position when the at least a handle is in an active position. The assembly also includes at least sensor in communication with the lever, wherein the at least sensor is configured to identify when the lever transitions from the thrust-engaged position to the thrust-disengaged position.

In another aspect, method of use for a lift lever assembly for a vertical takeoff and landing (VTOL) aircraft is disclosed. The method includes controlling, using a lever, a lift propulsor of an aircraft. The method also includes allowing transition, using at least a handle mechanically coupled to the lever, of the lever from a thrust-engaged position to a thrust-disengaged position when the at least a handle is in an active position. Finally, the method includes sensing, using at least sensor in communication with the lever, when the lever transitions from the thrust-engaged position to the thrust-disengaged position.

Invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
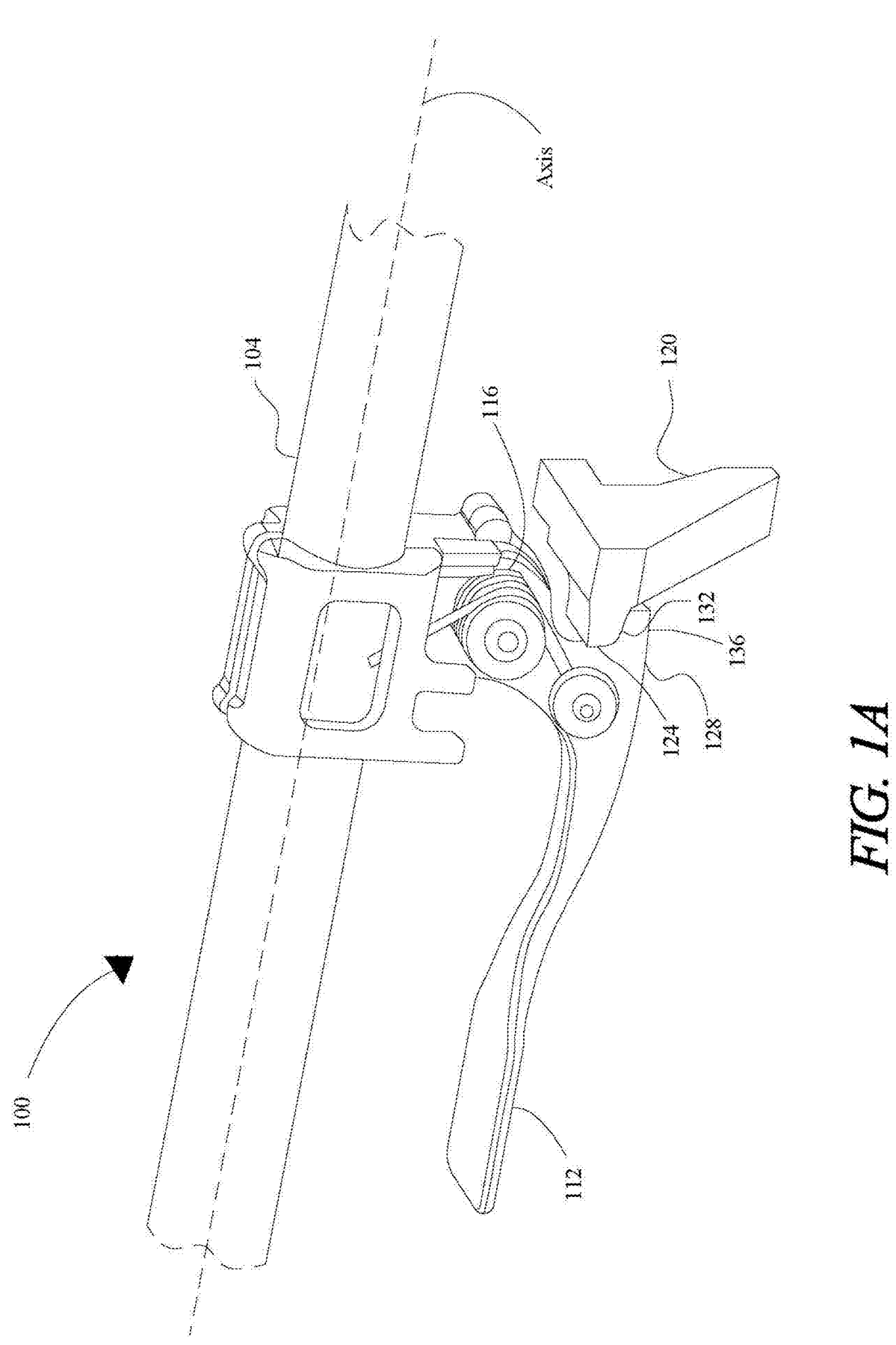
FIG. 1A is an illustration of an exemplary embodiment of a lift lever assembly for a VTOL aircraft.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an assembly and method for a lift lever of a VTOL. In an embodiment, a lift lever assembly includes a lever configured to control a lift propulsor of an aircraft. The assembly may additionally include at least a handle mechanically coupled to the lever, wherein the handle configured to allow transition of the lever from a thrust-engaged position to a thrust-disengaged position when the at least a handle is in an active position. The assembly may also include at least a sensor in mechanical communication with the lever, wherein the at least a sensor is configured to identify when the lever transitions from the thrust-engaged position to the thrust-disengaged position Now referring to FIGS. 1A and 1B, a lift lever assembly 100 for a vertical takeoff and landing (VTOL) aircraft is illustrated. VTOL may be an electric vertical takeoff and landing (eVTOL) aircraft. An exemplary embodiment of VTOL aircraft is illustrated in FIG. 2. Lift lever assembly 100 includes a lever 104 configured to control a thrust of a lift propulsor, also called a "vertical propulsor" in this disclosure, of a VTOL. As used in the current disclosure, a "lever" is a rigid bar resting on a hinge point. A support structure may attach lift lever assembly 100 to an aircraft frame of an aircraft having at least a vertical propulsor and at least a forward propulsor. In an embodiment, lift lever assembly 100 may be mechanically coupled to an aircraft. As used herein, "mechanically coupled" means that at least a portion of a device, component, or circuit is connected to at least a portion of the aircraft via a mechanical coupling. Said mechanical coupling may include, as a non-limiting example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling may be used to join two pieces of rotating electric aircraft components. Lift lever assembly 100 may be rotatably mounted to VTOL or a support structure in VTOL. Rotating lever 104 in a first direction may increase power to a vertical propulsor and rotating the lever 104 in a second direction opposite the first direction may decrease power to the vertical propulsor. Lever 104 may rotate through a substantially vertical plane, such that rotation in a direction a pilot would understand as "up" may correspond to increased throttle to vertical propulsors, while a direction a pilot would understand as "down" may correspond to decreased throttle. Lift lever assembly 100 and/or lever 104 may be consistent with disclosure of hover and forward thrust assembly and throttle lever, respectively, in U.S. patent application Ser. No. 16/929,206 filed on Jul. 15, 2020, and titled "A HOVER AND THRUST CONTROL ASSEMBLY FOR DUAL-MODE AIRCRAFT", which is incorporated by reference herein in its entirety.

Figure 1B:
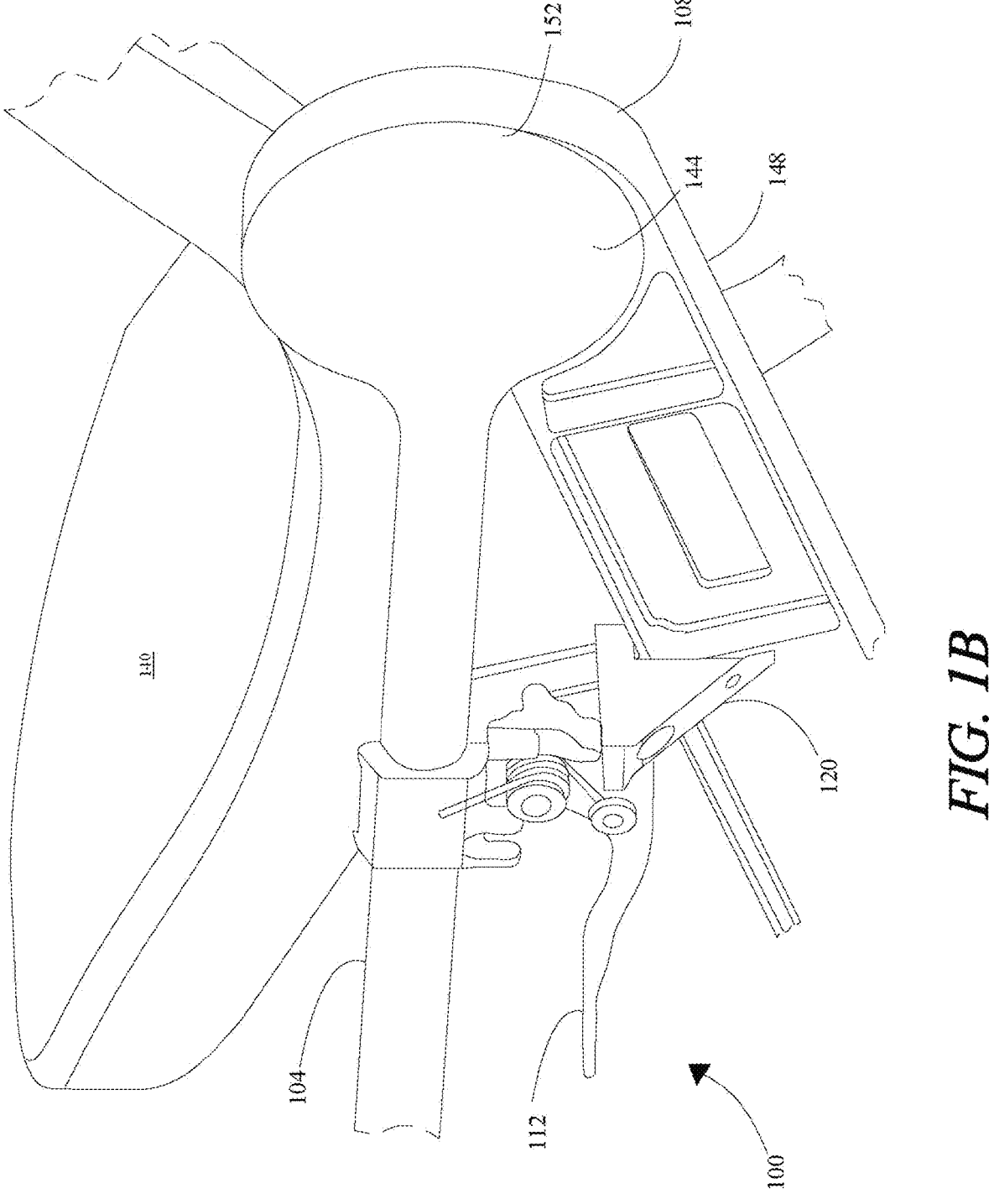
FIG. 1B is an illustration of an isometric view of an exemplary embodiment a lift lever assembly for a VTOL aircraft.
Figure 2:
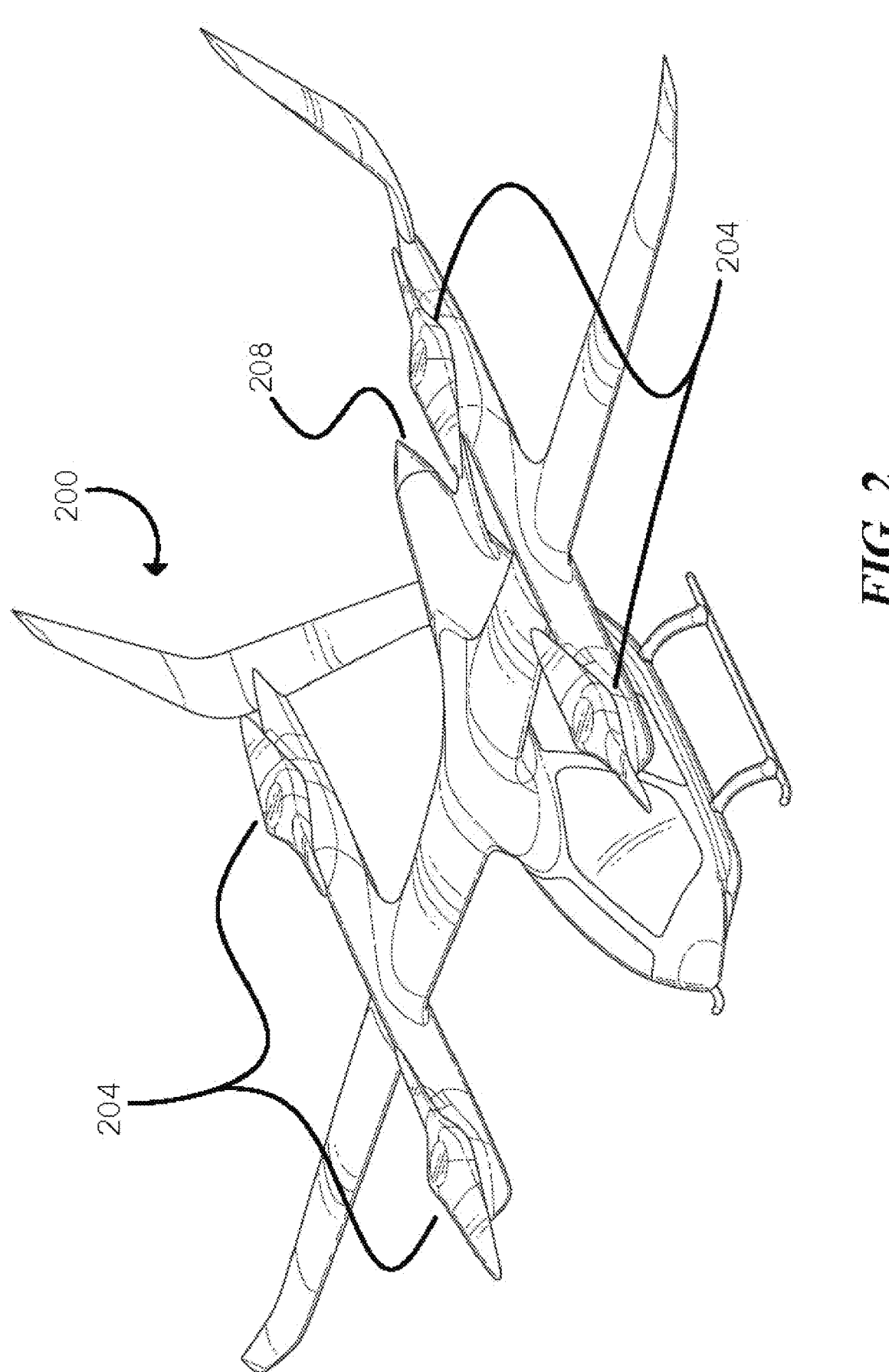
FIG. 2 is an illustration of an exemplary embodiment of an aircraft with vertical and forward propulsion.

Still referring to FIGS. 1A and 1B, lift lever assembly 100 may include an identifier 108 mechanically communicable with lever 104. As used in this disclosure, a first component is "mechanically communicable" with a second component when the first component is configured to physically affect the second component. Identifier 108 may be attached to lever 104. Identifier 108 is configured to identify when a position of lever 104 transitions from providing thrust to lift propulsor to providing no thrust to the lift propulsor. As used in this disclosure, an "identifier" is a component that identifies a transition between a thrust-engaged position of a lever and a thrust-disengaged position of the lever. In an embodiment, an identifier 108 may be configured to identify the position-of the leaver 108 as a function of a position parameter. An identifier may comprise at least a sensor as discussed in greater detail herein below. As used in this disclosure, a "thrust-engaged position" is a position of a lever that results in a command to a vertical propulsor to provide thrust. As an example, a thrust-engaged position may include any position of lever 104 that is not horizontal. As used in this disclosure, a "thrust-disengaged position" is a position of a lever that does not result in a command to a vertical propulsor to provide thrust. As an example, a thrust-disengaged position may be when lever 104 is oriented horizontally.

With continued reference to FIGS. 1A and 1B, lift lever assembly 100 includes a handle 112 attached to lever 104. As used in the current disclosure, a "handle" is an portion of an object adapted to allow a user to grip said object. Handle 112 may be configured to be in one of two positions, an active position, and an inactive position. As used in the current disclosure, an "active position" is when handle 112 is actuated by a user. In some embodiments, handle 112 may need to be fully compressed to be in an active position. Once handle 112 is in an active position transition of the lever 104 from a thrust-engaged position to a thrust-disengaged position is allowed as a function of the active position of the handle 112. When handle 112 is in an active position, lever 104 may be free to move from thrust-engaged position to thrust-disengaged position and from thrust-disengaged position to thrust-engaged position. In some embodiments, engaging the lift propulsors may include placing the handle 112 in the active position and placing the leave 104 in a thrust-engaged position. Lift lever assembly 100 may include a spring 116 configured to hold handle 112 in an active position. Spring 116 may be a torsion spring, bias spring, and/or any other spring configuration that may hold handle 112 in active position. Spring 116 may be configured to adjust a tension exerted on handle 112 to increase and/or decrease an amount of force required to place the handle 112 in an active position.

With continued reference to FIGS. 1A and 1B, handle 112 may be configured to be in inactive position. As used in the current disclosure, an "inactive position" is when handle 112 is not actuated by the user. A inactive position may include an air gap between handle 112 and lever 104, as depicted in FIGS. 1A and 1B. Transition of the lever 104 from the thrust-engaged position to a thrust-disengaged position may be restricted when handle is in an inactive position. The inactive position of handle 112 may be considered the default position. Lift lever assembly 100 may include a spring 116 configured to hold handle 112 in an inactive position. Spring 116 may be a torsion spring, bias spring, and/or any other spring configuration that may hold handle 112 in active position. Spring 116 may be configured to adjust a tension exerted on handle 112.

With continued reference to FIGS. 1A and 1B, lift lever assembly 100 may include a stopper 120. As used in the current disclosure, a "stopper" is component that is configured to restrict the movement of handle 112 and/or latch 128. Stopper 120 may include a distal end 124 extending from stopper 120. Distal end 124 may extend in a direction parallel to axis of lever 104. Handle 112 may include a latch 128 extending from handle 112 configured to engage with stopper 120 such as distal end 124. Stopper 120, specifically distal end 124, may be configured to prevent a movement of latch 128 and, thereby, prevent handle 112 from moving from inactive position to an active position. In some embodiments, disengaging the lift propulsors may comprise, disengaging the stopper 120, placing the handle 112 in an inactive position, and transitioning the lever 104 into the thrust-disengaged position. A stopper 120 may include a detent, lock, handle, haptic response, button, mechanical switch, and/or the like. Stopper 120 may be constructed of any suitable material or combination of materials, including without limitation metal such as aluminum, titanium, steel, or the like, polymer materials or composites, fiberglass, carbon fiber, wood, or any other suitable material.

Still referring to FIGS. 1A and 1B, in some embodiments, squeezing handle 112 may transition handle from an inactive position to an active position may cause latch 128 to retract from distal end 124. For example, lift lever assembly 100 may include a hinge 152 connected to lever 104 about which handle 112 may rotate. When handle 112 is in the active position, the handle 112 may rotate about hinge 152 and latch 128 may be displaced from stopper 120, allowing lever 104 to move into a thrust-disengaged position. Latch 128 may include an inner surface 132 and an opposing outer surface 136, wherein inner surface 132 is between lever 104 and outer surface 136. Inner surface 132 may contact stopper 120 when handle 112 is in inactive position, preventing lever 104 from moving into to thrust-engaged position. Outer surface 136 may include a gradual curvature that does not catch on distal end 124 when lever 104 is in thrust-disengaged position and moved toward thrust engaged position. Handle 112 may be configured to give when a force is exerted on outer surface 136 by distal end 124 such that latch 128 rotates away from stopper 120 or is otherwise displaced from stopper 120 to allow lever 104 to transition to a thrust disengaged position while handle 112 is in the active position, thus not requiring a pilot to actuate the handle 112 to engage a plurality of lift propulsors. Additionally, the leaver 104 may be allowed to transition between thrust engaged position and thrust disengaged position while the handle 112 is actuated. In some embodiments, the transition may not begin until the handle 112 is actuated. Stopper 120 may be adjustable to prevent the handle 112 from compressing when a force is exerted on outer surface 136 by distal end 124, requiring a pilot to disengage handle 112 to move lever 104 from thrust-disengaged position to a thrust-engaged position. In some embodiments, stopper 120 may be configured to prevent lever 104 from moving from a thrust-engaged position to a thrust-disengaged position when handle 112 is in an active position, requiring a pilot to squeeze handle 112 to move lever 104 to a thrust engaged position. An advantage to this configuration, for example, is that it will prevent pilot from unintentionally moving lever 104 to thrust-engaged position. Outer surface 136 may include a substantially flat surface that requires handle 112 to disengage from engaged position before lever 104 may move from inactive position to active position. Stopper 120 may be attached to a seat 140 in a cockpit. Stopper 120 may be positioned on a side of seat 140 so it is out of the way of a pilot while still being easily reachable. Stopper 120 may be attached to a floor of cockpit.

With continued reference to FIGS. 1A and 1B, in some embodiments, handle 112 may be coaxial with lever 104 and may be configured to twist or rotate in a direction perpendicular to an axis of the lever 104. Spring 116 may return handle 112 back to an unrotated position when a pilot is no longer actuating the handle 112. In some embodiments, handle 112 must be both actuated and rotated to allow transition of lever 104 from thrust-engaged position to thrust-disengaged position. In some embodiments, removing handle 112 from active position may require rotating handle 112 back to its default position prior to placing handle in the inactive position. In other embodiments, handle 112 may be configured to only rotate when it is displaced along the axis of lever 104.

Lift lever assembly 100 includes a sensor 144 configured to detect when lever 104 is in a thrust-engaged position or a thrust-disengaged position. In some embodiments, sensor 144 may include a plurality of sensors. In some embodiments, sensor 144 may be located at hinge 152. In some embodiments, sensor 144 may be located on handle 112. In some embodiments, sensor 144 may be located on lever 104. In some embodiments, sensor 144 may include sensors located in various places in lift lever assembly 100, such as a sensor at or near hinge 152 and a sensor at or near handle 112. Sensor 144 may be configured to determine a position parameter of lever 104 and generate a signal based on the position parameter. As used in this disclosure, a "sensor" is a device that is configured to detect an input and/or a phenomenon pertaining to a position of a lever and/or an identifier and generate a signal related to the detection; sensor 144 may include one or more sensors. For example, and without limitation, sensor 144 may transduce a detected position parameter of lever 104 and/or identifier 108. As used in this disclosure, a "position parameter" is a numerical or other measurable factor pertaining to a lever 104 and/or identifier 108. Sensor 144 may include a magnetic proximity sensor, inductive proximity sensor, Hall effects sensor, displacement sensor, light sensor, position sensor, encoder, and/or the like. Sensor 144 may be configured to detect an angle of lever 104. For example, sensor 144 may be configured to detect when lever 104 is approximately horizontal to a floor of a cockpit and when the lever 104 is at an angle to the floor. In some embodiments, lever 104 is positioned horizontally to floor when the lever 104 is in an active position and thrust-disengaged position. Sensor 144 may be configured to detect when handle 112 is in engaged position and/or when the handle 112 is disengaged. As a non-limiting example, sensor 144 may include a sensor mounted in handle 112. For example, an encoder, strain gauge, hall effect sensor, and the like may be used to detect the angular position of handle 112 and, thus, detect when the handle is in and engaged and/or disengaged position. In some embodiments, sensor 144 may include a contact sensor, pressure sensor, line of sight sensor, or the like. In these embodiments, sensor 144 may detect whether handle 112 is in an engaged and/or disengaged position by detecting the location of (or the presence/absence of contact from latch 128. Sensor 144 may be attached to lever 104; identifier 108 including handle 112, latch 128, stopper 120; seat 140; and/or another component in a cockpit proximate to lever 104.

Still referring to FIGS. 1A and 1B, lift lever assembly 100 may include a computing device 148 communicatively connected to sensor 144. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Computing device 148 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 148 may include a single computing device operating independently, or may include two or more computing device operating in concert, in parallel, sequentially or the like; two or more computing devices may be included together in a single computing device or in two or more computing devices. Computing device 148 may interface or communicate with one or more additional devices as described below in further detail via a network interface device. Network interface device may be utilized for connecting computing device 148 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 148 may include but is not limited to, for example, a computing device or cluster of computing devices in a first location and a second computing device or cluster of computing devices in a second location. Computing device 148 may include one or more computing devices dedicated to data storage, security, distribution of traffic for load balancing, and the like. Computing device 148 may distribute one or more computing tasks as described below across a plurality of computing devices of computing device, which may operate in parallel, in series, redundantly, or in any other manner used for distribution of tasks or memory between computing devices. Computing device 148 may be implemented using a "shared nothing" architecture in which data is cached at the worker, in an embodiment, this may enable scalability of lift lever assembly 100 and/or computing device.

With continued reference to FIGS. 1A and 1B, computing device 148 may be designed and/or configured to perform any method, method step, or sequence of method steps in any embodiment described in this disclosure, in any order and with any degree of repetition. For instance, computing device 148 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 148 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Computing device 148 may be configured to receive signal from sensor 144. Computing device 148 may be communicatively connected to an alert configured to notify pilot of a position of including when lever 104 is in inactive position and/or active position. For example, alert may be an auditory alert such as a beep, a visual alert such as a light or display, and/or a tactile alert such as a haptic response. Lever 104, handle 112, and/or seat 140 may be configured to produce a tactile response as an alert.

Figure 3:
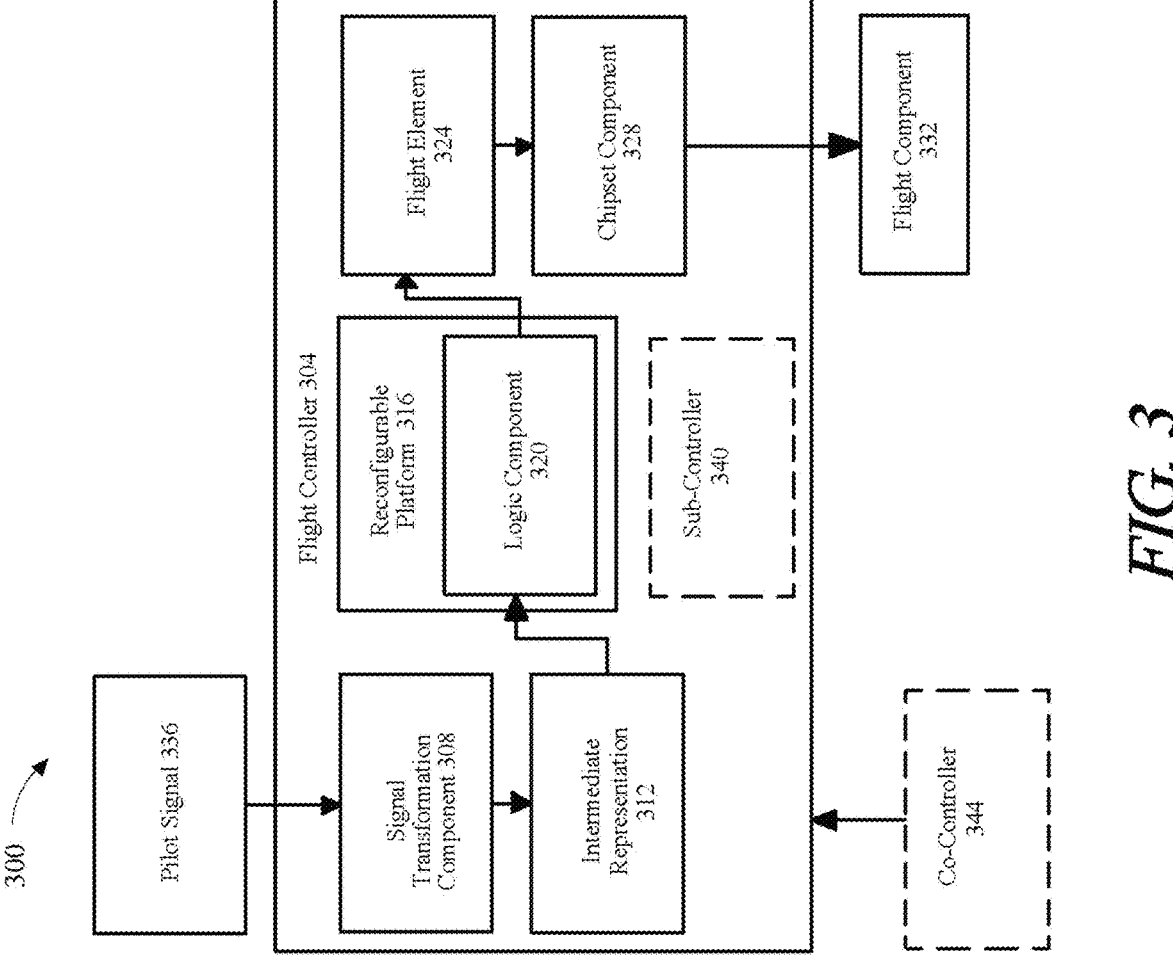
FIG. 3 is a block diagram of an exemplary flight controller.

With continued reference to FIG. 1, a computing device 148 may include a flight controller, such as the flight controller of FIG. 3. The signal of at least a sensor 144 or identifier 108 may be transmitted to the flight controller. The flight controller may regulate the functions of the vertical propulsors as function of the signal that is received from a sensor 144. Additionally, a flight controller may be configured to control the functions of the vertical propulsor as a function of a position parameter. In embodiments, a flight controller may be configured to start, stop, accelerate, and/or decelerate the vertical propulsors as a function of the position of lever 104.

Referring now to FIG. 2, an exemplary embodiment of a dual-mode aircraft 200 that may incorporate assembly as illustrated. Aircraft may include at least a vertical propulsor 204 and at least a forward propulsor 208. A forward propulsor is a propulsor that propels the aircraft in a forward direction. Forward in this context is not an indication of the propulsor position on the aircraft; one or more propulsors mounted on the front, on the wings, at the rear, etc. As used in the current disclosure, a "vertical propulsor" is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 204 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. At least a forward propulsor 208 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 204 and at least a forward propulsor 208 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle, or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varied or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. In an embodiment, autonomous machine-learning model may be further configured to utilize the attachment datum as input. In embodiments, autonomous machine-learning model may be further configured to utilize the identification datum as input. In some embodiments autonomous machine-learning model may be further configured to utilize the attachment datum and identification datum as inputs. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Leven-berg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above. In an embodiment, and without limitation, a neural network may receive semantic units as inputs and output vectors representing such semantic units according to weights wi that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
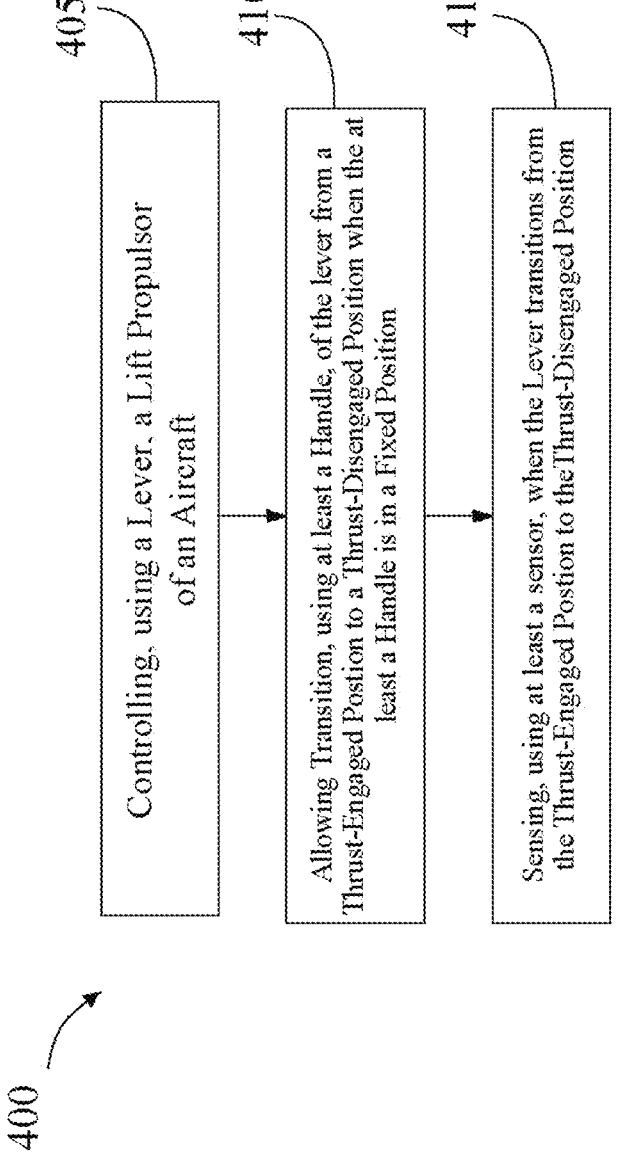
FIG. 4. is a flow diagram of an exemplary method of use for a lift lever assembly for a VTOL aircraft.

Referring to FIG. 4, an exemplary method 400 of use for a lift lever assembly for an vertical takeoff and landing (VTOL) aircraft. Method 400 includes a step 405 of controlling, using a lever, a lift propulsor of an aircraft. This may be implemented in accordance with FIGS. 1-3. In some embodiments, engaging the lift propulsors comprises disengaging a stopper, placing the at least a handle in an active position; and placing the lever in the thrust-engaged position. Disengaging the stopper may include rotating handle around a hinge. In other embodiments, disengaging the lift propulsors may include placing the at least a handle in an inactive position and transitioning the lever into the thrust-disengaged position. In other embodiments, the lift propulsor may be comprised of an electric motor. Additionally, the aircraft may include an electric vertical takeoff and landing (eVTOL) aircraft.

Still referring to FIG. 4, method 400 incudes a step of 410 of allowing transition, using at least a handle mechanically coupled to the lever, of the lever from a thrust-engaged position to a thrust-disengaged position when the at least a handle is in an active position. This may be implemented in accordance with FIGS. 1-3. In embodiments, at least a handle may be configured to restrict transition of the lever from the thrust-engaged position to a thrust-disengaged position when the at least a handle is in an inactive position.

Still referring to FIG. 4, method 400 incudes a step of 410 of sensing, using at least sensor in mechanical communication with the lever, when the lever transitions from the thrust-engaged position to the thrust-disengaged position. This may be implemented in accordance with FIGS. 1-3. In embodiments, at least a sensor is configured to detect a position parameter of the lever.

Still referring to FIG. 4, method 400 may additionally include restricting using at least a stopper. In embodiments, the stopper may be configured to restrict the transition of the lever from the thrust-engaged position to a thrust-disengaged position It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
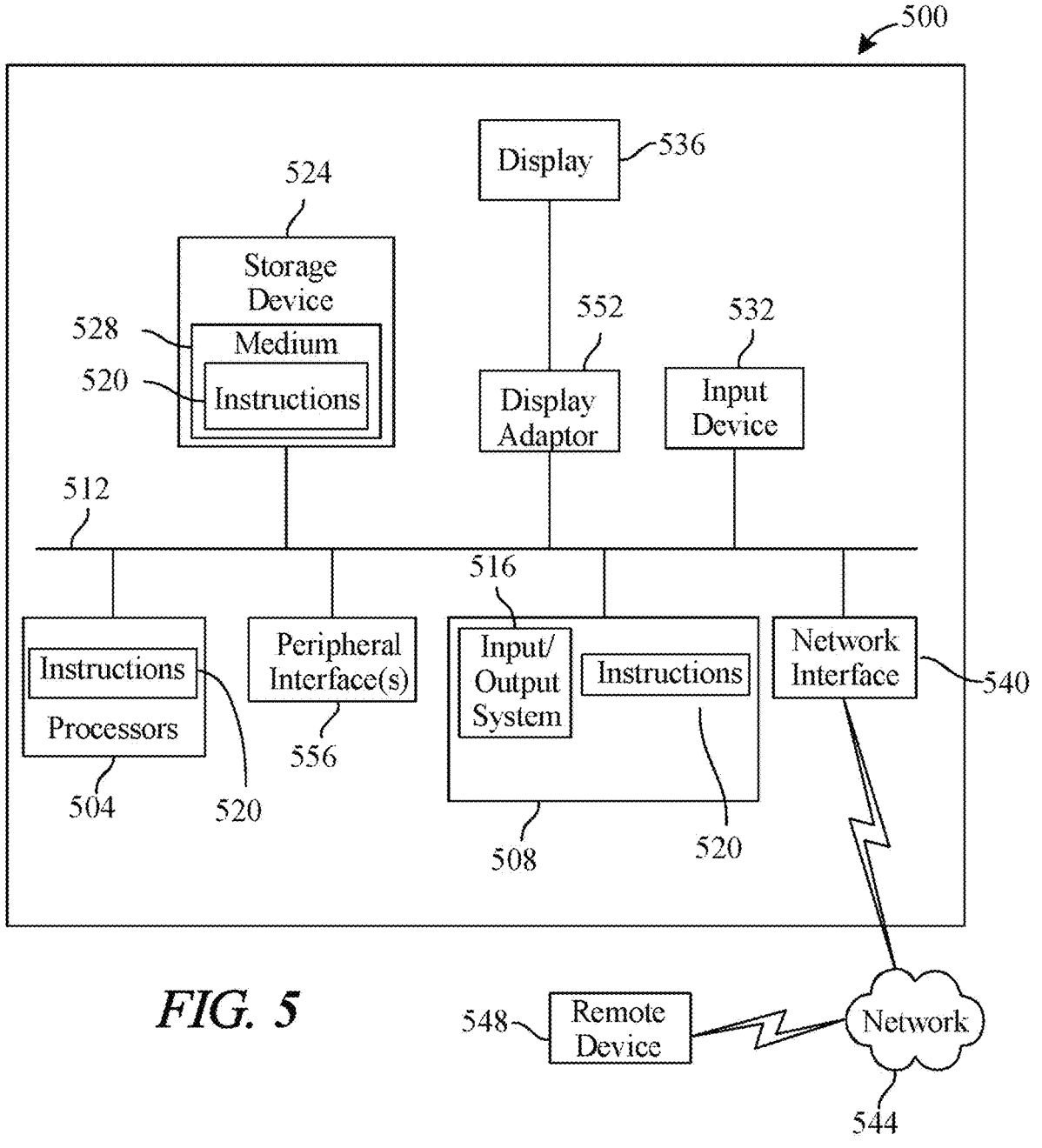
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1594 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 May provide nonvolatile and/or volatile storage of machine-readable instructions, data structures, program modules, and/or other data for computer system 500. In one example, software 320 may reside, completely or partially, within machine-readable medium 328. In another example, software 320 may reside, completely or partially, within processor 304.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIRE-WIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and devices according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A lift lever assembly for a vertical takeoff and landing (VTOL) aircraft, wherein the lift lever assembly comprises:
   a lever configured to control a lift propulsor of an aircraft, the lever positionable about a first hinge between a thrust-engaged position and a thrust-disengaged position;
   a handle disposed at a middle portion of a length between the first hinge and a distal end of the lever and mechanically coupled to the lever, the handle coupled to the lever through a second hinge and comprising:
      a latch having an outer surface and an inner surface; and
      a torsion spring configured to provide a rotational torque at the second hinge to bias the handle into an inactive position;
   wherein:
      the handle is configured to allow, while the handle is in an active position, transition of the lever from the thrust-engaged position to the thrust-disengaged position;
      the outer surface comprises a curved surface that contacts a stopper when the lever is pivoted into the thrust-engaged position and causes the handle to transition to the active position without a user input;

the inner surface contacts the stopper to prevent pivotal motion of the lever into the thrust-disengaged position when the handle is in the inactive position; and a computing device incorporated with the lift lever assembly, wherein the computing device is communicatively connected to an alert configured to output a notification in response to and describing a transition of the lever from the thrust-engaged position to the thrust-disengaged position.

2. The lift lever assembly of claim 1, wherein the handle is configured to restrict transition of the lever from the thrust-engaged position to a thrust-disengaged position while the at least a handle is in an inactive position.

3. The lift lever assembly of claim 1, wherein engaging the lift propulsor comprises:

disengaging at least a stopper;

placing the handle in the active position; and placing the lever in the thrust-engaged position.

4. The lift lever assembly of claim 3, wherein disengaging the stopper comprises rotating the handle on a hinge.

5. The lift lever assembly of claim 1, wherein disengaging the lift propulsor comprises:

placing the handle in an inactive position; and transitioning the lever into the thrust-disengaged position.

6. The lift lever assembly of claim 1, wherein the lift lever assembly further comprises stopper configured to restrict movement of the handle.

7. The lift lever assembly of claim 6, wherein the stopper is configured to restrict the transition of the lever from the thrust-engaged position to a thrust-disengaged position.

8. The lift lever assembly of claim 1, wherein the sensor is configured to detect a position parameter of the lever.

9. The lift lever assembly of claim 1, wherein the lift propulsor comprises an electric motor.

10. The lift lever assembly of claim 1, wherein the aircraft comprises an electric vertical takeoff and landing (eVTOL) aircraft.

11. A method of use for a lift lever assembly for a vertical takeoff and landing (VTOL) aircraft comprising:

controlling, using a lever, a lift propulsor of an aircraft between a thrust-engaged position and a thrust-disengaged position, wherein the lever comprises:

a handle disposed at a middle portion of a length of the lever between a hinge and a distal end of the lever and mechanically coupled to the lever through a second hinge and comprising:

a latch having an outer surface and an inner surface, wherein the outer surface comprises a curved surface that contacts a stopper when the lever is pivoted into the thrust-engaged position and causes the handle to transition to an active position without a user input, and wherein the inner surface contacts the stopper to prevent pivotal motion of the lever into the thrust-disengaged position when the handle is in an inactive position; and a torsion spring configured to provide a rotational torque at the second hinge to bias the handle into an inactive position;

wherein the handle is configured to allow transition of the lever from a thrust-engaged position to a thrust-disengaged position, wherein in the thrust-disengaged position the lever is oriented horizontally and in the thrust-engaged position the lever is oriented in a position that is not horizontal;

an identifier mechanically communicable with the lever and comprising a sensor; and a computing device incorporated with the lever, wherein the computing device is communicatively connected to an alert;

allowing transition, using the handle, of the lever from the thrust-engaged position to the thrust-disengaged position when the handle is in an active position;

sensing, using the sensor and the identifier, a position of the lever;

determining, using the computing device, a transition of the lever from the thrust-engaged position to the thrust-disengaged position; and generating, at the computing device incorporated with the lever and in response to the transition, a notification of the transition to the alert.

12. The method of claim 11, wherein the handle is configured to restrict transition of the lever from the thrust-engaged position to a thrust-disengaged position while the handle is in an inactive position.

13. The method of claim 11, wherein engaging the lift propulsor comprises:

disengaging at least a stopper;

placing the handle in an active position; and placing the lever in the thrust-engaged position.

14. The method of claim 13, wherein disengaging the stopper comprises rotating the handle on a hinge.

15. The method of claim 11, wherein disengaging the lift propulsor comprises:

placing the handle in an inactive position; and transitioning the lever into the thrust-disengaged position.

16. The method of claim 11, wherein the method further comprises restricting motion of the lever using at least a stopper.

17. The method of claim 16, wherein the method further comprises restricting, using the stopper, the transition of the lever from the thrust-engaged position to a thrust-disengaged position.

18. The method of claim 11, wherein the method further comprises sensing, using the sensor, a position parameter of the lever.

19. The method of claim 11, wherein the lift propulsor comprises an electric motor.

20. The method of claim 11, wherein the aircraft comprises an electric vertical takeoff and landing (eVTOL) aircraft.

* * * * *